US012224496B2

(12) United States Patent
Yin et al.

(10) Patent No.: US 12,224,496 B2
(45) Date of Patent: Feb. 11, 2025

(54) SIGNAL TRANSMISSION APPARATUS

(71) Applicant: SHENZHEN TCL DIGITAL TECHNOLOGY LTD., Shenzhen (CN)

(72) Inventors: Liuzhong Yin, Shenzhen (CN); Zitong Wang, Shenzhen (CN); Bin Zhang, Shenzhen (CN)

(73) Assignee: SHENZHEN TCL DIGITAL TECHNOLOGY LTD., Guangdong (CN)

( * ) Notice: Subject to any disclaimer, the term of this patent is extended or adjusted under 35 U.S.C. 154(b) by 148 days.

(21) Appl. No.: 17/998,495

(22) PCT Filed: Dec. 29, 2020

(86) PCT No.: PCT/CN2020/140889
§ 371 (c)(1),
(2) Date: Nov. 11, 2022

(87) PCT Pub. No.: WO2021/227526
PCT Pub. Date: Nov. 18, 2021

(65) Prior Publication Data

US 2023/0216217 A1 Jul. 6, 2023

(30) Foreign Application Priority Data

May 11, 2020 (CN) ........................ 202010392408.3

(51) Int. Cl.
*H01Q 21/28* (2006.01)
*H01Q 1/38* (2006.01)
*H01Q 1/52* (2006.01)

(52) U.S. Cl.
CPC ............... *H01Q 21/28* (2013.01); *H01Q 1/38* (2013.01); *H01Q 1/521* (2013.01)

(58) Field of Classification Search
CPC .......... H01Q 21/28; H01Q 1/38; H01Q 1/521; H01Q 1/2291; H01Q 5/371; H01Q 9/045; H01Q 9/42; H01Q 1/36
See application file for complete search history.

(56) References Cited

U.S. PATENT DOCUMENTS 5,262,791 A 11/1993 Tsuda et al.
2008/0143612 A1 6/2008 Iwai et al.
(Continued)

FOREIGN PATENT DOCUMENTS

CN 101197464 A 6/2008
CN 101841601 A 9/2010
(Continued)

OTHER PUBLICATIONS

International Search Report in International application No. PCT/CN2020/140889, mailed on Mar. 26, 2021.
(Continued)

*Primary Examiner* — Dimary S Lopez Cruz
*Assistant Examiner* — Austin M Back
(74) *Attorney, Agent, or Firm* — PV IP PC; Wei Te Chung

(57) ABSTRACT

A signal transmission apparatus is provided in the present disclosure, including: a substrate, and a BLUETOOTH antenna and WI-FI antennas which are provided on a same side edge of the substrate. At least two branches of the WI-FI antennas are provided, and the BLUETOOTH antenna and the WI-FI antennas are provided at intervals. According to the present disclosure, the BLUETOOTH antenna and the WI-FI antennas are provided on the same side edge of the substrate, and the BLUETOOTH antenna and the WI-FI antennas are provided at intervals, so that all the antennas of the signal transmission apparatus are provided at an edge of a terminal board, thereby facilitating signal transmission and
(Continued)

solving a problem in the prior art that the BLUETOOTH antenna and the WI-FI antennas are respectively provided on two side edges of the substrate, affecting data transmission.

12 Claims, 6 Drawing Sheets

(56) References Cited

U.S. PATENT DOCUMENTS

| | | | | |
|---|---|---|---|---|
| 2008/0198082 | A1* | 8/2008 | Soler Castany | H01Q 1/38 343/893 |
| 2012/0169552 | A1 | 7/2012 | Lee et al. | |
| 2013/0043316 | A1* | 2/2013 | Liu | H01Q 1/2225 235/492 |
| 2018/0123242 | A1* | 5/2018 | Jeon | H01Q 5/30 |
| 2020/0058981 | A1 | 2/2020 | Chang et al. | |
| 2020/0118781 | A1* | 4/2020 | Wang | H04B 10/548 |

FOREIGN PATENT DOCUMENTS

| | | | | |
|---|---|---|---|---|
| CN | 102496773 | A | 6/2012 | |
| CN | 107369881 | A | 11/2017 | |
| CN | 207409659 | U | 5/2018 | |
| CN | 109256622 | A | 1/2019 | |
| CN | 208507947 | U * | 2/2019 | H01Q 19/185 |
| CN | 208548979 | U | 2/2019 | |
| CN | 208675427 | U | 3/2019 | |
| CN | 109742507 | A | 5/2019 | |
| CN | 209072659 | U | 7/2019 | |
| CN | 110112584 | A | 8/2019 | |
| CN | 110165383 | A | 8/2019 | |
| CN | 209806033 | U | 12/2019 | |
| CN | 110828979 | A | 2/2020 | |

OTHER PUBLICATIONS

Written Opinion of the International Search Authority in International application No. PCT/CN2020/140889, mailed on Mar. 26, 2021.

1st Chinese Office Action issued in corresponding Chinese Patent Application No. 202010392408.3 dated Mar. 3, 2022, pp. 1-7.

2nd Chinese Office Action issued in corresponding Chinese Patent Application No. 202010392408.3 dated Jul. 20, 2022, pp. 1-8.

* cited by examiner

| mark | horizontal angles | pitch angle | range |
|---|---|---|---|
| m1 | 90.0000 | 90.0000 | 0.3733 |
| m2 | -90.0000 | -90.0000 | -3.8735 |

| mark | horizontal angles | Pitch angle | range |
|---|---|---|---|
| m1 | -90.0000 | -90.0000 | -12.4516 |
| m2 | 90.000 | 90.000 | 31.3328 |

SIGNAL TRANSMISSION APPARATUS

CROSS-REFERENCE TO RELATED APPLICATIONS

The present disclosure is a US national phase application based upon an International Application No. PCT/CN2020/140889, filed on Dec. 29, 2020, which claims priority to Chinese invention No. 202010392408.3, filed on May 11, 2020, titled "SIGNAL TRANSMISSION APPARATUS", which is incorporated by reference in the present disclosure in its entirety.

FIELD OF INVENTION

The present disclosure relates to a technical field of antennas, and especially to a signal transmission apparatus.

BACKGROUND OF INVENTION

At present, there are more and more multi-antenna systems, and the multi-antenna systems generally comprise a BLUETOOTH™ (BT) BLUETOOTH antenna and WI-FI™ antennas. BT is a wireless personal area network (WPAN) technology, and WI-FI™ is a/wireless local area network (WLAN) technology. An existing BT antenna is provided on a broad side edge of a substrate, while the WLAN antennas are provided on another broad side edge of the substrate. However, when an antenna module is placed on a terminal board, it needs to be as close to an edge as possible, so that an effect of transmitting signals of an antenna is better. Therefore, antennas in the prior art are provided on two side edges, and the antenna on one side edge must be farther from an edge, affecting data transmission.

Therefore, the prior art has defects and needs to be improved and developed.

SUMMARY OF INVENTION

A technical problem to be solved by the present disclosure is to provide a signal transmission apparatus in view of above-mentioned defects in the prior art, aiming to solve a problem in the prior art that a BT antenna and WLAN antennas are respectively provided on two side edges of a substrate, which affects data transmission.

A technical solution adopted by the present disclosure to solve the technical problem is as follows:

a signal transmission apparatus, wherein comprises: a substrate, and a BT antenna and WLAN antennas which are provided on a same side edge of the substrate; at least two branches of the WLAN antennas are provided, and the BT antenna and the WLAN antennas are provided at intervals.

Further, the BT antenna is a magnetic current source BT antenna, and the WLAN antennas are current source WLAN antennas.

Further, the WLAN antennas are configured with two branches, which are a first WLAN antenna and a second WLAN antenna respectively, and the BT antenna is arranged between the first WLAN antenna and the second WLAN antenna.

Further, the substrate is provided with a circuit ground, a first WLAN antenna RF ground, and a second WLAN antenna RF ground; the BT antenna is arranged on the circuit ground, the first WLAN antenna is arranged on the first WLAN antenna RF ground, and the second WLAN antenna is arranged on the second WLAN antenna RF ground.

Further, a first dividing slit is defined between the circuit ground and the first WLAN antenna RF ground, and a second dividing slit is defined between the circuit ground and the second WLAN antenna RF ground.

Further, widths of the first dividing slit and the second dividing slit are greater than or equal to 0.1 mm.

Further, microstrip transmission lines are arranged in the substrate, a circuit module is arranged on the circuit ground, and both the first WLAN antenna and the second WLAN antenna are connected to the circuit module through the microstrip transmission lines.

Further, a routing mode of the microstrip transmission lines is vertical routing or parallel routing.

Further, the magnetic current source BT antenna is a microstrip magnetic current source BT antenna and has a radiation slit.

Further, the WLAN antennas are configured as vertical polarization antennas.

Further, the substrate is an FR4 substrate.

Further, the substrate is a hollow cuboid, and the BT antenna and the WLAN antennas are arranged in the substrate and are close to a same long side edge.

Further, the widths of the first dividing slit and the second dividing slit are both configured to be 1 mm.

Further, the microstrip transmission lines are CPW transmission lines.

Further, the first dividing slit and the second dividing slit are formed by etching slits.

Further, a length of the radiation slit is greater than a half of a wavelength of a medium.

The signal transmission apparatus provided in the present disclosure comprises: the substrate, and the BT antenna and the WLAN antennas which are provided on the same side edge of the substrate. At least two branches of the WLAN antennas are provided, and the BT antenna and the WLAN antennas are provided at intervals. According to the present disclosure, the BT antenna and the WLAN antennas are provided on the same side edge of the substrate, and the BT antenna and the WLAN antennas are provided at intervals, so that all the antennas of the signal transmission apparatus are provided at the edge of the terminal board, thereby facilitating signal transmission and solving the problem in the prior art that the BT antenna and the WLAN antennas are respectively provided on the two side edges of the substrate, which affects data transmission.

10, substrate; 20, BT antenna; 30, WLAN antenna; 40, circuit ground; 41, circuit board; 50, first WLAN antenna RF ground; 60, second WLAN antenna RF ground; 70, first dividing slit; 80, the second dividing slit; 90, microstrip transmission line.

DETAILED DESCRIPTION OF PREFERRED EMBODIMENTS

In order to make the objections, technical solutions, and effects of the present disclosure clearer and clearer, the present disclosure will be further described in detail below with reference to the accompanying drawings and examples. It should be understood that the specific embodiments described herein are only used to explain the present disclosure, but not to limit the present disclosure.

An existing BT antenna is provided on one broad side edge of a substrate, and two branches of WLAN antennas are arranged on another broad side edge of the substrate, so the BT antenna and the WLAN antennas are distanced to a maximum extent; an antenna module needs to be placed as close to an edge as possible when it is placed on a terminal board to have a better effect of transmitting signals of an antenna; however, antennas in the prior art are distributed on two side edges, and the antenna on one side edge must be farther from an edge, affecting data transmission. The present disclosure solves this problem; in the present disclosure, all BT antenna and WLAN antennas are provided on a same side edge of the substrate, so that when the signal transmission apparatus is installed on the terminal board, the side edge where the BT antenna and the WLAN antennas are installed is assembled to the edge, thereby facilitating signal transmission.

Figure 1:
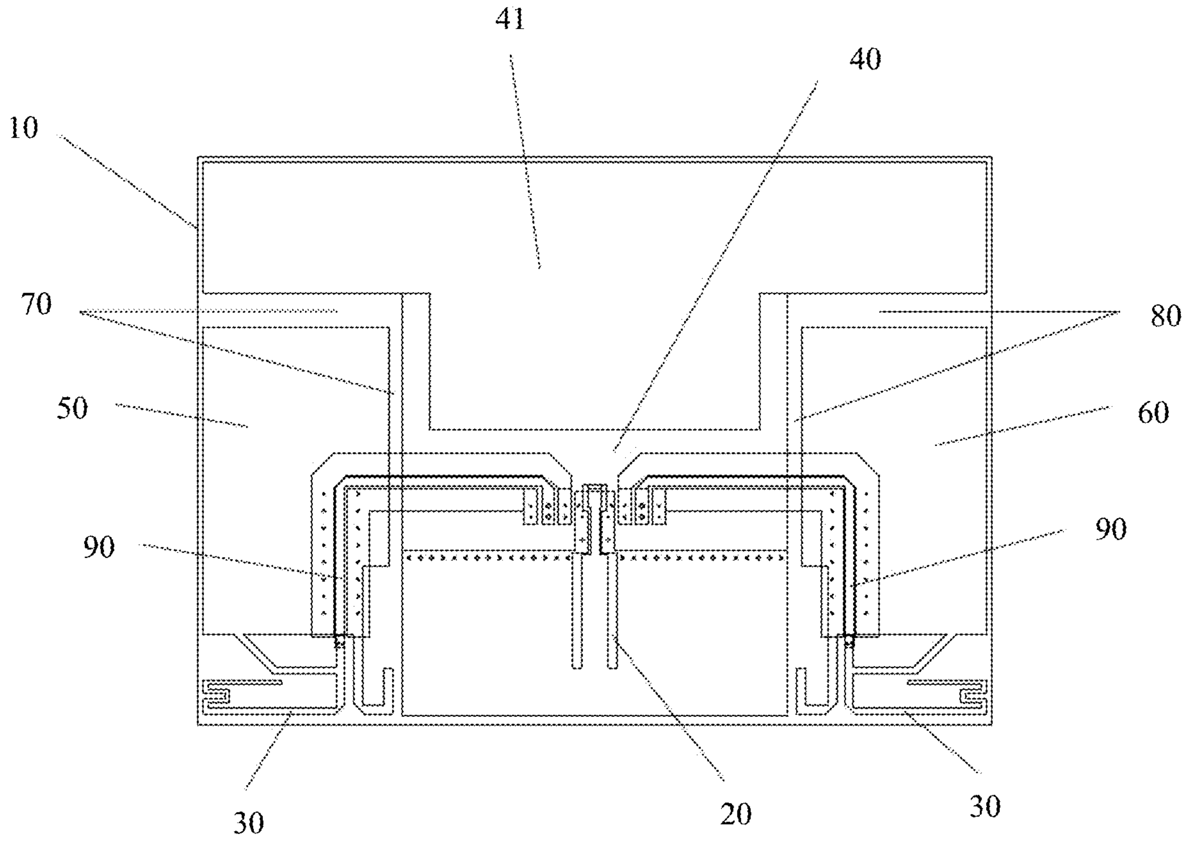
FIG. 1 is a perspective diagram of a preferred embodiment of a signal transmission apparatus in the present disclosure.
Figure 2:
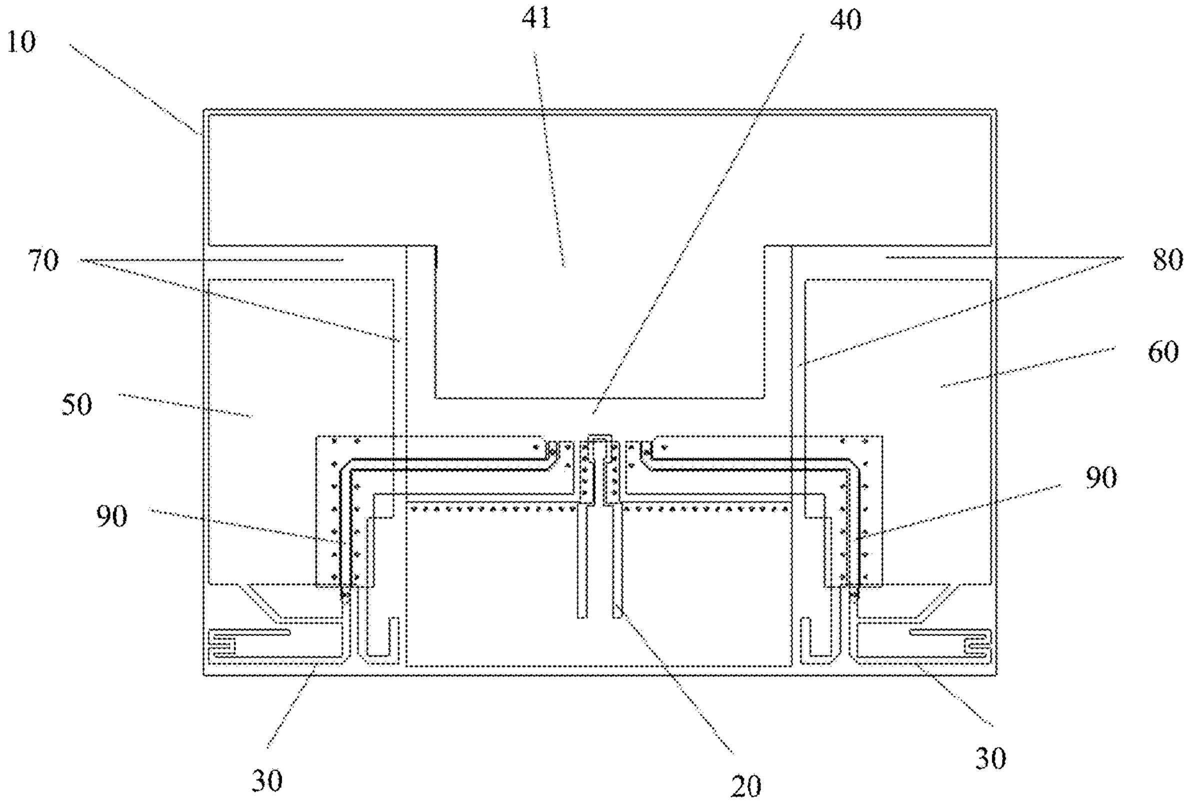
FIG. 2 is a perspective diagram of another preferred embodiment of the signal transmission apparatus in the present disclosure.

Please refer to FIG. 1 and FIG. 2, a signal transmission apparatus provided in the present disclosure comprises: a substrate 10, and a BT antenna 20 and WLAN antennas 30 provided on the substrate 10; the BT antenna 20 and the WLAN antennas 30 are provided on a same side edge of the substrate 10. At least two branches of WLAN antennas 30 are provided, and the BT antenna 20 and the WLAN antennas 30 are provided at intervals. The BT antenna 20 is arranged between the WLAN antennas 30. If more than two of the WLAN antennas 30 are provided, for example, three of the WLAN antennas 30 are provided, then one of the WLAN antennas 30 is provided on one side of the BT antenna 20, and two of the WLAN antennas 30 are provided on another side of the BT antenna 20. Two adjacent WLAN antennas 30 are also arranged at intervals to improve an isolation degree.

Specifically, the substrate 10 is a hollow cuboid, the BT antenna 20 and the WLAN antennas 30 are arranged in the substrate 10 and are close to a same long side edge. In this way, the antennas of the signal transmission apparatus can be arranged on an edge of the terminal board, thereby facilitating signal transmission and solving the problem in the prior art that the BT antenna and the WLAN antennas are respectively provided on two side edges of the substrate, which affects data transmission. Moreover, in the present disclosure, all the antennas are arranged on the long side edge of the substrate, compared with all the antennas arranged on the broad side edge of the substrate, which is advantageous to isolation between the antennas in terms of the distance.

Further, in a field of the antennas, a certain isolation degree is often required between multiple antennas. However, when multiple antenna systems are integrated into one module, a spatial distance of the antennas is small, and it is very difficult to improve the isolation degree. In a design that the WLAN antennas and the BLUETOOTH (BT) antenna share a same module and are integrated, the isolation degree between individual antennas is often achieved by distancing the antennas. For example, considering that a requirement of the isolation degree between the WLAN antennas and the BT antenna is high, while a requirement of isolation degree between the WLAN antennas is relatively low, the BT antenna is placed on one side edge of the substrate, and the two WLAN antennas are placed on another side edge of a circuit board to distance to a maximum extent.

When the above methods are actually used, a target isolation state cannot be achieved between the individual antennas. A main reason is that a shortest wavelength of an antenna carrier signal is 12 cm, and co-frequency isolation must reach more than −30 dB, and a spatial distance must reach more than two wavelengths. Completely adopting a spatial isolation method will increase a volume of the integrated antenna module, and it is difficult to realize a miniaturization of the antenna module.

In addition, the spatial isolation method is currently WLAN used to improve the isolation degree; when arranging, the two WLAN antennas are basically arranged in parallel, while an orientation of the BT antenna is orthogonal to the WLAN antennas, in order to achieve polarization orthogonal isolation. However, because the three antennas share a same circuit ground, antenna radiation is not only the antenna itself, but also the circuit board connected thereto, so a polarization isolation effect is also limited.

A fundamental reason for above isolation results is that the antennas used in the existing multiple antenna modules are all current source antennas, that is, the existing BT antenna and the WLAN antennas are all current source antennas. Then, it is difficult to realize orthogonal polarization between the two types of the antennas, thereby realizing the polarization isolation.

Therefore, the BT antenna 20 is arranged as a magnetic current source BT antenna in the present disclosure, and the WLAN antennas 30 are arranged as current source WLAN antennas. A radiation source of the magnetic current source BT antenna is a magnetic current source, and a radiation source of the current source WLAN antennas is a current source, and both are arranged at intervals; that is, the magnetic current source BT antenna is always arranged between the current source WLAN antennas. In this way, the orthogonal polarization is achieved by using the antennas with different radiation sources in an interaction direction, thereby achieving polarization isolation. At the same time, an RF ground of the BT antenna 20 has an isolation function, and the isolation degree between the WLAN antennas 30 is also significantly improved. That is to say, an RF ground of the magnetic current source is arranged between the WLAN antennas to achieve isolation between the WLAN antennas. The isolation degree between the WLAN antennas can be significantly improved, thereby reducing a possibility of using spatial isolation and meeting a requirement of module miniaturization.

In an embodiment, two branches of the WLAN antennas 30 are provided, which are a first WLAN antenna and a second WLAN antenna, and the BT antenna 20 is arranged between the first WLAN antenna and the second WLAN antenna. Specifically, in the present disclosure, a magnetic current source antenna is provided as the BT antenna 20, two current source vertical polarization antennas are provided as the WLAN antennas 30, and the two WLAN antennas 30 are located on both sides of the BT antenna 20 to realize the polarization isolation between the BT antenna 20 and the WLAN antennas 30. At the same time, an RF ground of the magnetic current source antenna has an isolation effect on RF grounds of the two WLAN antennas 30, and the isolation degree between the two WLAN antennas 30 can be significantly improved.

Since the two WLAN antennas 30 and the one BT antenna 20 in the prior art are arranged on the circuit board, all the RF grounds of the three antennas are the circuit ground 40; that is, the two WLAN antennas 30 and the one BT antenna 20 have the common RF ground, which greatly reduces effects of various isolation methods. In order to solve the above problems, the present disclosure no longer only arranges the circuit ground in the substrate 10, the circuit ground is a PCB board, but arranges the circuit ground 40, a first WLAN antenna RF ground 50, and a second WLAN antenna RF ground 60 in the substrate 10. The BT antenna 20 is arranged on the circuit ground 40, the first WLAN antenna is arranged on the first WLAN antenna RF ground 50, and the second WLAN antenna is arranged on the second WLAN antenna RF ground 60 to prevent the two WLAN antennas 30 and the one BT antenna 20 from having the same RF ground to reduce the isolation degree.

Further, a first dividing slit 70 is defined between the circuit ground 40 and the first WLAN antenna RF ground 50, and a second dividing slit 80 is defined between the circuit ground 40 and the second WLAN antenna RF ground 60. That is to say, the circuit ground 40, the first WLAN antenna RF ground 50, and the second WLAN antenna RF ground 60 are independently arranged. Specifically, the RF grounds where the WLAN antennas 30 are located in the present disclosure separate the first WLAN antenna RF ground 50 and the second WLAN antenna RF ground 60 from the circuit ground 40 by etching slits on the PCB board. The isolation of the slits of the antenna RF ground causes the multiple antennas share the same circuit board but does not share the same ground. By controlling a direction of an RF current, polarization characteristics of radiation are controlled. That is to say, the first WLAN antenna RF ground 50 and the second WLAN antenna RF ground 60 are both separated from the circuit ground 40 with the dividing slits, so that the three grounds have no direct connection among them, and there is no possibility of indirect coupling, which overcomes a problem that the effects of various isolation methods are greatly reduced due to the common RF ground among the multiple antennas. When more than two of the WLAN antennas 30 are provided, for example, three of the WLAN antennas 30 are provided, then one of the WLAN antennas 30 is provided on one side of the BT antenna 20, and two of the WLAN antennas 30 are provided on another side of the BT antenna 20. A dividing slit is also defined between the RF grounds of two adjacent WLAN antennas 30 to improve the isolation degree.

Further, widths of the first dividing slit 70 and the second dividing slit 80 are greater than or equal to 0.1 mm. In an embodiment, the widths of the first dividing slit 70 and the second dividing slit 80 are configured to be about 1 mm. That is to say, each of the first WLAN antenna RF ground 50 and the second WLAN antenna RF ground 60 has a slit of about 1 mm from the circuit ground 40. Specifically, each of the widths of the first dividing slit 70 and the second dividing slit 80 is configured to be 1 mm.

Further, a microstrip transmission line 90 is arranged in the substrate 10, a circuit module is arranged on the circuit ground 40, and both the first WLAN antenna 30 and the second WLAN antenna 30 are connected to the circuit module through the microstrip transmission line 90, thereby performing data transmission.

Further, a routing mode of the microstrip transmission line 90 is vertical routing or parallel routing. That is to say, the microstrip transmission line 90 (i.e., an RF transmission line) is an orthogonal routing layout, and an orthogonal layout of the vertical routing and the horizontal routing are arranged to ensure that a polarization mode of the antenna is not affected, thereby ensuring that the orthogonal polarization isolation is not affected by routing and deteriorates. The routing of the microstrip transmission line 90 comprises two ways as shown in FIG. 1 and FIG. 2.

In an embodiment, the microstrip transmission line 90 is a CPW transmission line. That is to say, both the first WLAN antenna and the second WLAN antenna are connected to the circuit module through the CPW transmission line, so as to realize the data transmission of the WLAN antennas 30.

In an embodiment, the BT antenna 20 is a microstrip BT antenna and has a radiation slit. Specifically, the microstrip BT antenna has only one radiation slit. Further, a length of the radiation slit can be particularly lengthened, so that the length of the radiation slit is greater than a half of a wavelength of a medium.

Further, the WLAN antennas 30 are arranged as the current source vertical polarization antennas; the substrate 10 is an FR4 substrate. Preferably, the substrate 10 adopts a low-loss high-frequency board FR4 base material.

Figure 3:
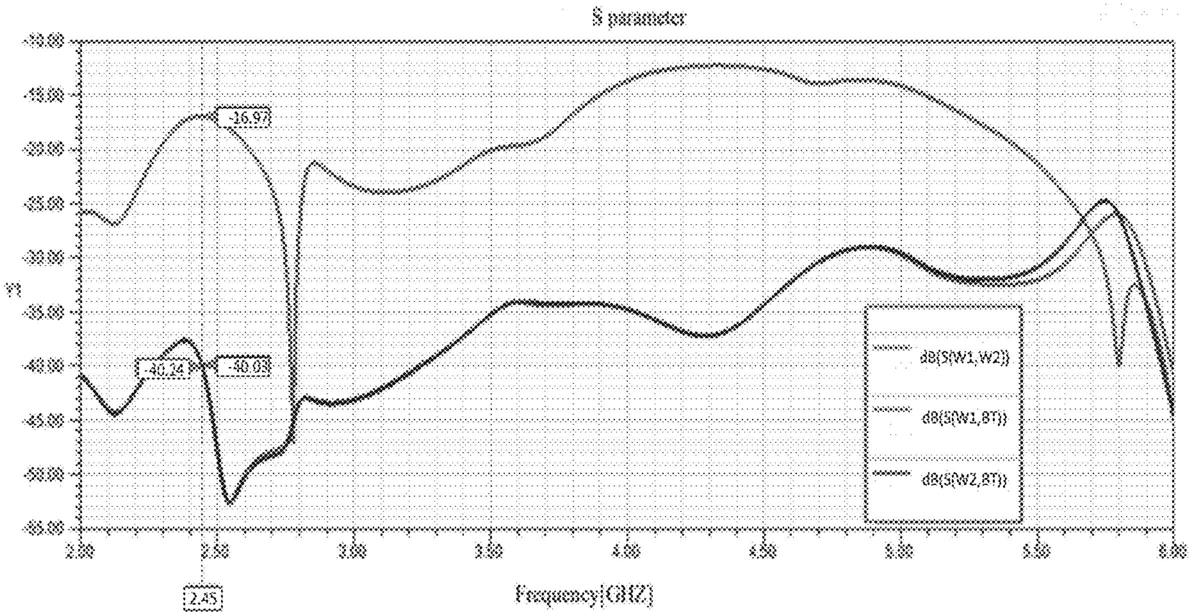
FIG. 3 is an isolation degree parameter diagram of a WLAN antenna and BT antennas in the preferred embodiment of the signal transmission apparatus in the present disclosure.
Figure 4:
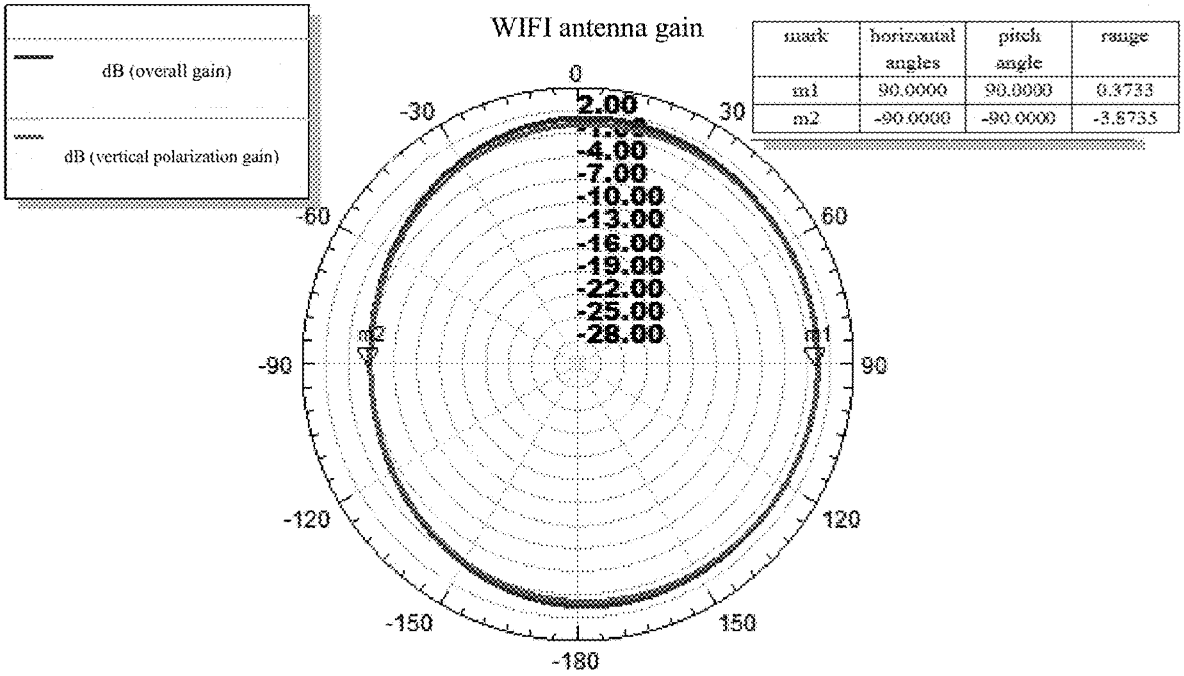
FIG. 4 is an omnidirectional horizontal radiation diagram of the WLAN antennas in the preferred embodiment of the signal transmission apparatus in the present disclosure.
Figure 5:
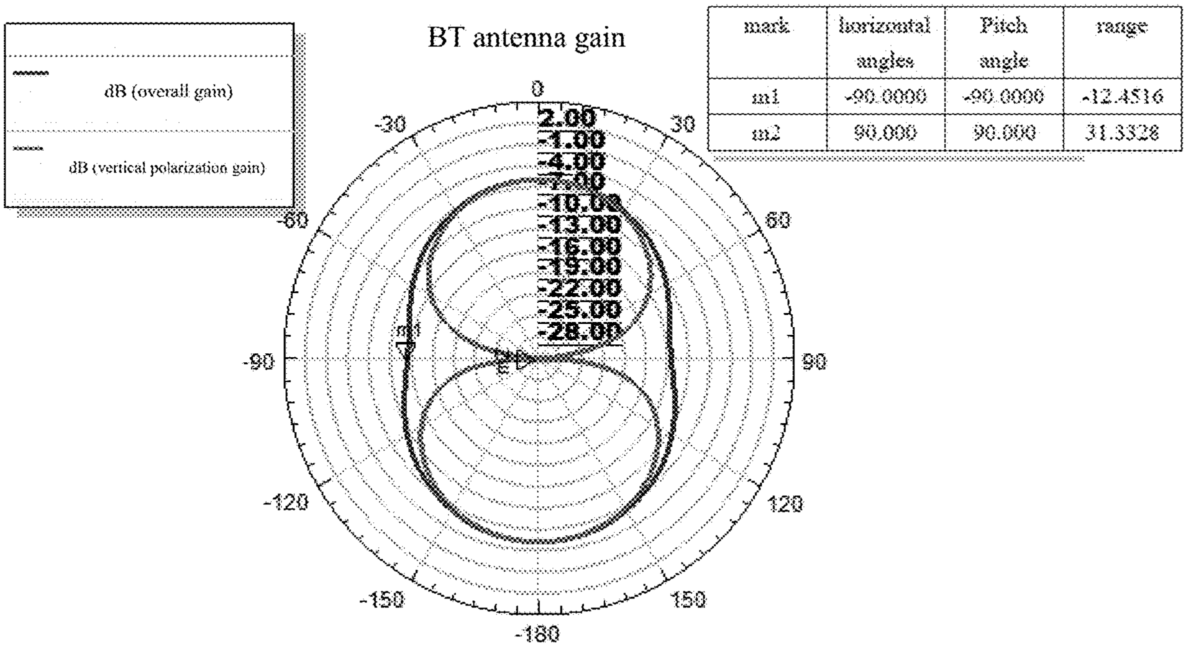
FIG. 5 is a radiation direction diagram of the BT antenna in the preferred embodiment of the signal transmission apparatus in the present disclosure.
Figure 6:
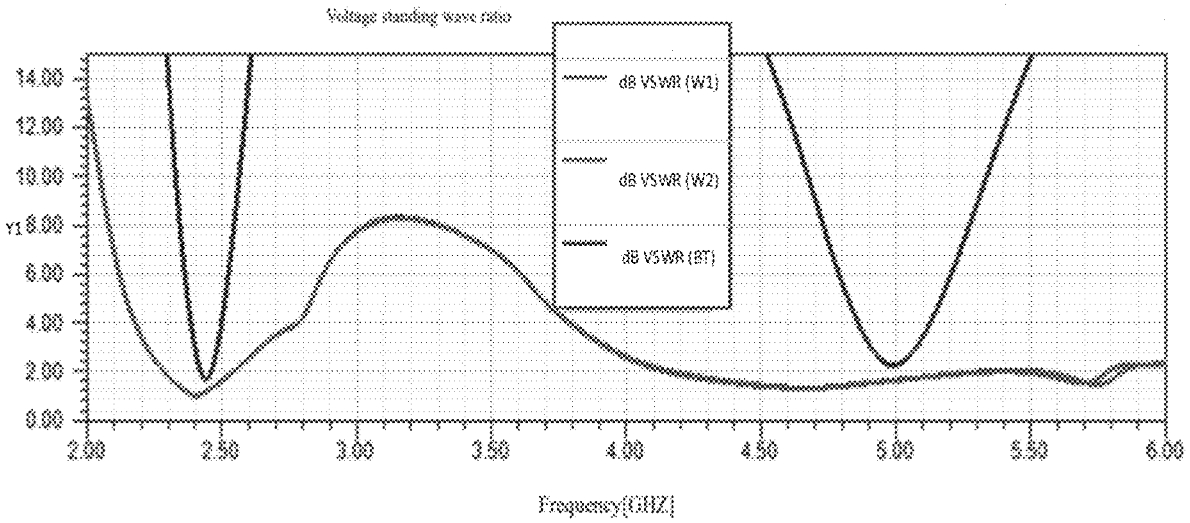
FIG. 6 is a VSWR characteristic diagram of the WLAN antennas and the BT antenna in the preferred embodiment of the signal transmission apparatus in the present disclosure.

The present disclosure realizes the orthogonal polarization by using the antennas with the different radiation sources, thereby realizing the polarization isolation, and arranges the RF ground of the magnetic current source between the WLAN antennas to realize the isolation between the WLAN antennas, and does not need to completely utilize spatial isolation and meets the requirement of the module miniaturization. By the isolation method of the present disclosure, the isolation degree of the WLAN antennas can reach −16 dB, and the isolation degree between the WLAN and BT antennas can reach more than −40 dB, as shown in FIG. 3. The WLAN antennas achieve omnidirectional horizontal radiation as shown in FIG. 4, and a radiation diagram of the BT antenna is shown in FIG. 5, and forward gain and reverse gain exceed-10 dB. Voltage standing wave ratio (VSWR) characteristics of the three antennas are shown in FIG. 6. Therefore, the forward gain is significantly improved, the WLAN antennas achieve omnidirectional no-blind area in a horizontal plane, transmission is smooth, and a throughput rate is approximately doubled in all directions. Therefore, the present disclosure improves the isolation degree between the antennas under a condition of multiple antennas, thereby improving the throughput rate of WLAN and an electromagnetic compatibility of BT & WLAN.

In summary, the signal transmission apparatus provided in the present disclosure comprises: the substrate, and the BT antenna and the WLAN antennas which are provided on the same side edge of the substrate. At least two branches of the WLAN antennas are provided, and the BT antenna and the WLAN antennas are provided at intervals. According to the present disclosure, the BT antenna and the WLAN antennas are provided on the same side edge of the substrate, and the BT antenna and the WLAN antennas are provided at intervals, so that all the antennas of the signal transmission apparatus are provided at the edge of the terminal board, thereby facilitating signal transmission, and solving the problem in the prior art that the BT antenna and the WLAN antennas are respectively provided on two side edges of the substrate, affecting the data transmission.

What is claimed is:

1. A signal transmission apparatus, comprising:

a substrate; and a wireless personal area network (WPAN) antenna and wireless local area network (WLAN) antennas which are provided on a same side edge of the substrate;

at least two branches of the WLAN antennas are provided, and the WPAN antenna and the WLAN antennas are provided at intervals;

wherein the WPAN antenna is a magnetic current source WPAN antenna, and the WLAN antennas are current source WLAN antennas;

wherein the WLAN antennas are configured to two branches, which are a first WLAN antenna and a second WLAN antenna, and the WPAN antenna is arranged between the first WLAN antenna and the second WLAN antenna;

wherein the substrate is provided with a circuit ground, a first WLAN antenna RF ground, and a second WLAN antenna RF ground, the WPAN antenna is a microstrip magnetic current source WPAN antenna formed as a radiation slit arranged on the circuit ground, the first WLAN antenna is arranged on the first WLAN antenna RF ground, and the second WLAN antenna is arranged on the second WLAN antenna RF ground.

2. The signal transmission apparatus as claimed in claim 1, wherein a first dividing slit is defined between the circuit ground and the first WLAN antenna RF ground, and a second dividing slit is defined between the circuit ground and the second WLAN antenna RF ground.

3. The signal transmission apparatus as claimed in claim 1, wherein, widths of the first dividing slit and the second dividing slit are greater than or equal to 0.1 mm.

4. The signal transmission apparatus as claimed in claim 3, wherein microstrip transmission lines are arranged in the substrate, a circuit module is arranged on the circuit ground, both the first WLAN antenna and the second WLAN antenna are connected to the circuit module through the microstrip transmission lines.

5. The signal transmission apparatus as claimed in claim 4, wherein a routing mode of the microstrip transmission line is vertical routing or parallel routing.

6. The signal transmission apparatus as claimed in claim 1, wherein the WLAN antenna is configured as a vertical polarization antenna.

7. The signal transmission apparatus as claimed in claim 1, wherein the substrate is an FR4 substrate.

8. The signal transmission apparatus as claimed in claim 1, wherein the substrate is a hollow cuboid, and the WPAN antenna and the WLAN antennas are arranged in the substrate and are close to a same long side edge.

9. The signal transmission apparatus as claimed in claim 3, wherein the widths of the first dividing slit and the second dividing slit are both configured to be 1 mm.

10. The signal transmission apparatus as claimed in claim 4, wherein the microstrip transmission line is a CPW transmission line.

11. The signal transmission apparatus as claimed in claim 2, wherein the first dividing slit and the second dividing slit are formed by etching slits.

12. The signal transmission apparatus as claimed in claim 1, wherein a length of the radiation slit is greater than half of a wavelength of a medium.

* * * * *